United States Patent Office 3,024,205
Patented Mar. 6, 1962

3,024,205
ACTIVATION OF CLAY BY ACID TREATMENT, AGING IN CONDITIONED OIL, AND CALCINATION
Albert H. Pedler, Tallahasse, Fla., assignor to Minerals & Chemicals Philipp Corporation, Menlo Park, N.J., a corporation of Maryland
No Drawing. Filed Jan. 31, 1957, Ser. No. 637,373
2 Claims. (Cl. 252—450)

This invention relates to the preparation of adsorptive contact masses from naturally occurring acid-activatable clays. The invention particularly relates to a process by means of which contact masses suitable in size range, and other desirable properties, for use as catalysts in the well-known fixed or moving bed hydrocarbon cracking processes are produced from kaolin clay. Although, as above stated, the adsorptive contact masses of my invention are especially useful as hydrocarbon conversion catalysts in well-known cracking processes, they also have usefulness as adsorbents for decolorizing vegetable and mineral oils and for various other purposes. The above-mentioned hydrocarbon cracking processes are employed, as is well known, for the purpose of converting petroleum hydrocarbons to gasoline.

In fixed bed cracking, the hydrocarbon vapors are passed through a stationary bed of catalyst particles, while in moving bed cracking processes, as exemplified by Thermofor catalytic cracking (T.C.C.) and Houdriflow operations, the catalyst particles gravitate towards the base of the reactor from whence they are conveyed through regenerators and back to the top of the reaction zone for another pass therethrough. The Houdriflow process differs from the T.C.C. process in the manner of conveying regenerated catalyst particles for recirculation through the reactor, a gas lift being used in the former case and elevators in the latter. Catalyst particles for fixed and moving bed processes are relatively coarse, ranging in size from about 10-mesh to about 4-mesh, and usually in the form of pellets or "beads."

To be acceptable, a cracking catalyst should possess adequate activity and hardness and it should exhibit satisfactory catalyst life while in service. The reason for needing good cracking activity in a catalyst is self-evident, and a sufficient degree of hardness is necessary therein to minimize attrition of the catalyst particles during their utilization. Attrition is detrimental since it results in loss of active catalyst as fines, which are carried out in the effluent vapor stream, with attendant increase in operating cost. Catalyst life, as the name implies, simply refers to the period of economic usefulness of a catalyst in service.

In a copending U.S. patent application of Serial No. 53,625, filed September 2, 1960, which is a continuation of an earlier application, Serial No. 499,515, filed April 5, 1955, now abandoned, by James V. Weir and Alfred J. Robinson, there is disclosed an improved process for the preparation of adsorptive contact masses from naturally occurring acid-activatable clays and particularly from kaolin clays. In its preferred embodiment, the process of said copending application involves mixing clay and sulfuric acid together to produce a plastic mass; forming appropriately sized masses, as for example by extrusion, from said plastic mass; aging the clay-acid masses in a hot hydrocarbon liquid for a period of time such as to permit substantial reaction between the clay, particularly the alumina of said clay, and the acid; and calcining the aged clay-acid masses at a temperature level sufficiently high to decompose aluminum sulfate which formed therein during the aging and to thereby convert said masses to high quality adsorptive contact masses especially suitable as hydrocarbon cracking catalysts.

The process disclosed in the aforesaid copending application of Weir and Robinson, as pointed out therein, represents a radical departure from the well-known prior art acid leaching methods of activating clays, particularly subbentonite clays, to thus convert them to a form in which they are suitable as adsorptive contact materials. These prior art acid leaching methods comprise essentially the basic steps of reacting the clay with dilute acid, usually dilute sulfuric acid, to convert part of said clay to water soluble form and then leaching or washing substantially all of the resulting water soluble material from the clay-acid reaction product with water, leaving behind a residue from which is obtained the final product and which is of different chemical composition than the starting clay since a portion of said clay has been removed in the leaching step. In the novel process of the copending Weir and Robinson application, on the other hand, the clay is reacted with sulfuric acid and then the clay-acid mixture is calcined to decompose water soluble products of the reaction, which products correspond substantially to those leached from said mixture in the prior art acid leaching methods, and to convert said mixture to a material suitable for adsorptive contact purposes which material is substantially the same in chemical composition as the starting clay, on a volatile free basis, but of enhanced activity. The prior art acid leaching processes can be considered wet methods of clay activation since they entail an aqueous leaching step, whereas the process of the copending Weir and Robinson application can be considered a dry one in that it does not require aqueous leaching of the clay-acid reaction product for removal of its water soluble portion.

The present invention is the result of my discovery of a preliminary conditioning treatment of the hydrocarbon liquid in which the clay-acid mixture is aged, as taught in the copending application of Weir and Robinson, whereby a substantial improvement in hardness of final contact masses is attained. Thus contact masses, produced according to the Weir and Robinson process of the aforesaid copending patent application in which the aging is carried out in a hot hydrocarbon liquid which has previously been conditioned, as taught herein, will be found to be of high quality adsorptive contact masses of hardness substantially superior to that of contact masses produced in the same manner except aged in a hydrocarbon liquid which has not been subjected to the aforesaid preliminary conditioning treatment.

According, it is one object of the present invention to provide an improved process for preparing adsorptive contact masses from clay.

A further object of the invention is to provide an improved process for preparing hydrocarbon cracking catalysts of superior hardness.

Other objects and advantages of the invention will be apparent from the description thereof which follows.

As previously noted, the process of the present invention is intended primarily for use on kaolin clays, by which is meant those naturally occurring clays containing kaolinite as the chief mineral constituent. The approximate chemical composition of kaolinite is represented by the formula: $Al_2O_3 \cdot 2SiO_2 \cdot 2H_2O$. The weight ratio of $SiO_2$ to $Al_2O_3$, indicated by this formula, is 1.18 and kaolin clays normally possess $SiO_2/Al_2O_3$ ratios of from 1.0 to 1.5.

While I prefer to use degritted raw clay (that which has been refined only to the extent that grit, foreign bodies and clots of undispersed clay have been eliminated) as a starting material in my process, I wish to have it clearly understood that the invention is not limited to the treatment of such a product. Clays which have received other preliminary treatments may still be amenable to processing in accordance with teachings herein.

Examples of preliminary treatments falling within this category are deironing by physical or chemical methods, conventional classifying operation, and even partial acid activation by the previously mentioned wet procedures. The volatile matter content (V.M.) of the starting clay should preferably not be so high as to make too dilute a mixture of clay and acid for optimum handling under the conditions of the particular processing involved. I have obtained excellent results using a starting clay of about 14 percent V.M. with moderate dosages of concentrated sulfuric acid. By volatile matter (V.M.) is meant that part of the clay which would be eliminated by heating said clay at a temperature of about 1700° F. to substantially constant weight. The weight of the clay without its volatile matter is referred to as the volatile free (V.F.) weight of said clay.

In putting the process of my invention into practice, a naturally occurring clay, as for example kaolin clay, and sulfuric acid are first mixed to an appearance of homogeneity in any apparatus suitable for the purpose, as for example a pug mill. The clay-acid mixture is then extruded to form pellets, or otherwise shaped into masses within the desired size range. Next, the pellets or shaped masses are immersed and aged in hydrocarbon liquid, which has been previously conditioned in the manner hereinafter disclosed, under such conditions of time and temperature as to bring about substantially complete reaction between the clay and the acid. This aging of the pellets, or other shaped masses may be accomplished, for example, in a screw conveyor by conveying said pellets or masses, while immersed in the hydrocarbon liquid at the desired temperature level, therethrough at a rate such as to afford adequate time for substantially complete reaction between clay and acid.

The aged pellets are finally subjected to calcination treatment, to effect desulfation thereof, with attendant conversion of said pellets to high-quality adsorptive contact masses particularly suitable as hydrocarbon cracking catalysts. The term pellets, as used above and hereinafter throughout the specification and claims, except as otherwise indicated, is intended to include within its meaning not only extruded pellets but other suitably shaped masses within the proper size range which have been formed by methods well-known to those skilled in the art.

I prefer to use concentrated sulfuric acid, such as the commercially available 66° Bé. (about 93 percent $H_2SO_4$) grade, for the clay-acid reaction of my process, water being added, if necessary, to facilitate ease of pugging, or otherwise mixing, the ingredients. However, any strength acid consistent with proper plasticity of mix for the dosage employed can be used within the scope of my invention. I prefer to use acid dosages from about 60 percent to about 100 percent in my process, acid dosage being defined as the weight of 100 percent acid per weight of volatile free clay expressed on a percentage basis.

Although acid dosages much lower than 60 percent down to as low as 20 percent in fact, can be used in my process with some benefit, the clay conversion gradually falls off with decreasing dosage until ineffectual levels are reached. With the lower dosages of acid, it has been found necessary to have higher water/acid ratios in the mix than will suffice for more normal dosages, the principal reason for this being to adjust the said mixes to conditions of optimum plasticity for working. When a 20 percent dosage is employed, for example, good plasticity is attainable with a dilute acid of only 50 percent $H_2SO_4$ concentration. On the other hand, very high acid dosages, particularly on clays of relatively coarse particle size, sometimes produce mixtures too thin for adequate workability. In this event, the situation can frequently be remedied by either grinding the clay prior to acid addition or by substituting fuming sulfuric acid for the more dilute acid conventionally used. Although my preferred range of acid dosage has been given as that from about 60 percent to about 100 percent, dosages higher than 100 percent can be used within the scope of my invention so long as a workable mix is obtainable in the process. Approximately 130 percent dosage represents the amount of acid that would be theoretically required for substantially complete reaction with an average kaolin clay, although amounts in excess of this can be used within the scope of my invention.

As previously indicated, the mixture of clay and acid is preferably formed into masses of appropriate size by extrusion or equivalent method before the aging step of my process. The forming operation can be performed by extrusion, pilling or any equivalent method known to those skilled in the art; my preferred method being extrusion by means of an auger mill or extruder. For best results in extrusion, the V.M. of the mix should be between about 30 and about 65 percent, with the preferred range being from 50 to 55 percent.

The hydrocarbon liquid in which the pellets are aged should be one which is substantially non-reactive with sulfuric acid, at the aging temperature level, although minor amounts of matter capable of reacting with the acid can be tolerated therein. These hydrocarbon liquids should preferably have low vapor pressures at the aging temperatures, but I do not wish to exclude the possibility of using lower boiling materials in conjunction with a condenser system to prevent loss of vapors. Examples of readily available hydrocarbon liquids which are suitable for our process are saturated aliphatic higher molecular weight hydrocarbons which have been treated with sulfuric acid for removal of sulfonatable components such as, for example, certain white mineral oils. Kerosene can also be used as the aging medium if condenser systems are available.

Optimum temperatures for my oil aging fall between the limits of about 220° F. and about 400° F. and optimum times within the range from about 1 to about 24 hours, with the times required depending on the temperatures used. I prefer to age within the temperature range from 275° to 325° F. for a period of from about 1 to about 5 hours. When aging temperatures become too high, the clay-acid reaction proceeds rapidly and the final product is excessively soft. When aging temperatures are too low, the product is also soft but in this case the cause seems to stem from insufficient reaction due to a very slow reaction rate.

As previously indicated, the hydrocarbon liquid in which the pellets are aged is subjected to a preliminary conditioning treatment for the purpose of effecting substantial improvement in the hardness of the final contact masses. Although the pellets can be aged in hydrocarbon liquid which has not been subjected to said preliminary conditioning treatment the final contact masses will be found to be of only mediocre hardness by comparison with adsorptive contact masses produced in the same manner, except for the preliminary conditioning of the oil in which they are aged. The preliminary conditioning treatment of the present invention comprises contacting the hydrocarbon liquid with a mixture of a natural occurring acid-activatable clay and sulfuric acid for a certain period of time prior to using said hydrocarbon liquid as an aging medium in the present process. The hydrocarbon liquid should preferably be at a temperature within the range of suitable aging temperatures for the pellets of the present process during its conditioning treatment.

I wish to point out that the clay in the primary conditioning treatment does not necessarily have to be the same type of clay as that from which the clay-acid pellets, which are subsequently aged in the conditioned oil, are prepared.

A simple method of conditioning the hydrocarbon liquid is by using said liquid as the aging medium in the process of the aforesaid copending application of Weir and Robinson for a period of time sufficient to convert the liquid to such condition that upon subsequent use as an aging medium it contributes to substantially increased hardness of the final contact masses. The optimum time of conditioning of the hydrocarbon liquid, when employing the above-mentioned aging method, will vary, depending on the operating conditions of the particular process involved. I have found, however, that when conditioning a white mineral oil by employing it as the aging medium in the process of the copending Weir and Robinson application wherein kaolin clay is activated with preferred acid dosages and concentrations of sulfuric acid, and preferred aging temperatures are used, about 50 hours of continuous use of said oil conditions it to a sufficient extent to render it operative for utilization in the process of the present invention. By continuous use of the oil in the aforesaid Weir and Robinson process, for conditioning purposes, is meant continuous circulation through, out of, and back into the aging apparatus as clay-acid pellets are passed through said aging apparatus on a continuous basis. Thus, the aging liquid is not in continuous contact with a particular batch of pellets during conditioning but is continually recirculating through the aging apparatus and in this manner repeatedly contacting clay-acid pellets, in all stages of reaction, during its conditioning treatment.

The time of conditioning hydrocarbon liquids may be continued beyond that necessary to effect maximum improvement in said liquids without detriment thereto. In addition, the conditioned hydrocarbon liquids may be used substantially indefinitely as aging mediums for clay-acid pellets without deterioration, insofar as their hardening effect on the final adsorptive masses are concerned. It is not essential that the hydrocarbon liquids used for make-up purposes be previously conditioned as taught herein; fresh hydrocarbon liquids which have not been so conditioned may be used in normal make-up quantities with substantially no lowering of the hardness of the final pellets or other deleterious aftereffects. It should be pointed out that the conditioned hydrocarbon liquids of my invention should be employed as soon as practicable after conditioning for if they are withheld from use for sufficiently long periods of time they lose their ability to effect substantial improvement in the hardness of the final contact masses. However, upon being reconditioned such hydrocarbon liquids can be restored to the form or condition in which they again are effective in improving the hardness of the final contact masses. Thus, commercial plants employing my process might find it necessary after plant shut-downs to recondition their previously used hydrocarbon liquids, before reusing them, in order to obtain the benefits of my invention. The only thing to remember when continuously using conditioned hydrocarbon liquids for aging of clay-acid pellets, is that make-up liquids must be added to compensate for losses of conditioned liquids which occur in the system.

It is not understood how the conditioning treatment of the present invention renders a hydrocarbon liquid capable of contributing to improved hardness of final adsorptive contact masses. However, I wish to point out that it is necessary to have both clay, and sulfuric acid present in the hydrocarbon liquid during its conditioning treatment to obtain the benefits of the present invention. That sulfuric acid alone is insufficient to condition said liquid is indicated by the fact that preferred hydrocarbon liquids for my process are white mineral oils which, as previously stated, have already been subjected to contact with sulfuric acid (for removal of sulfonatable components) but which still require my conditioning treatment with clay and sulfuric acid before they exhibit the pellet hardening ability disclosed herein.

In the calcination of the aged pellets, to effect their desulfation, I have found that for best results the temperature should be between the limits of about 900° and about 1600° F. and the calcination time should preferably be not greater than about 24 hours. The tempera-
ture and times of calcinations will depend to a large extent on the atmosphere within the furnace in which the pellets are calcined. While I do not wish to exclude calcination temperatures outside of the range disclosed, I would like to make clear that at temperatures much below 900° F. the aluminum sulfate decomposition may be incomplete and that temperatures above 1600° F. may result in lowered activity of the final product.

It is within the scope of my invention to incorporate not more than about 10 percent, on a total weight of mix basis, of a combustible filler into the clay-acid mixture of my process prior to formation of the said mixture into shaped masses. This filler, among other things, serves to increase the porosity of the final catalyst since it is eliminated during the calcination step leaving voids behind. Examples of filler suitable for my purpose are wood flour, corn meal, sawdust, carbon and the like.

Following are examples which are included herein for the purpose of demonstrating the improvement in hardness attainable by means of my novel conditioning of hydrocarbon liquids prior to using them as aging mediums in my present process. These examples are for purposes of illustration only and they should not be construed as limiting the invention to any particular embodiments disclosed therein.

*Example 1*

This example is a control test to indicate the degree of hardness attainable when clay-acid pellets are aged in a hydrocarbon liquid which has not been conditioned.

Georgia kaolin clay is mixed with sulfuric acid of about 93.2 percent concentration, the amount of acid used being equivalent to a dosage of about 80 percent. The mixture of clay and acid is formed into pellets about 3/16 in. long and of about 3/16 in. diameter by extrusion. The extruded pellets are aged in unconditioned white mineral oil, at a temperature of about 300° F., for a period of about three hours. The aged pellets are calcined in an atmosphere of steam and hot flue gases containing reducing components until they have been substantially desulfated, during which operation they reach a maximum temperature of about 1430° F. The desulfated pellets are tested by the well-known Cat-A test for catalytic activity.

The Cat-A test comprises a procedure described by J. Alexander and H. G. Shimp in an article on page R537 of National Petroleum News, Technical Section, August 2, 1944. In this method, a standard light East Texas gas oil is contacted at a rate of 5 cc. per minute for 10 minutes with 200 cc. of catalyst pellets at 800° F. The liquid product from the cracking test is collected at a temperature of 60° F. Catalytic activity is measured as the volume percent yield of gasoline on a no-loss basis (N.L.B. gasoline yield) and given as the volume of 410° F. endpoint gasoline distilled from the aforesaid cracked product, corrected for 100 percent recovery, expressed as a percentage of the volume of gas oil charged. As part of the Cat-A test, the weight of coke deposited on the catalyst, weight of gas produced, and gas specific gravity are determined. The coke and gas weights are expressed as percentages of gas oil charged. Two Cat-A cycles are run with only the data from the second cycle being used since experience has shown these data to be sound. In general the ratio of N.L.B. gasoline yield to coke yield should exceed about 9/1 or 10/1; gas gravity should be at least 1.2 or higher.

The Cat-A test on the pellets of this example reveals an N.L.B. gasoline yield of about 32 percent, a ratio of N.L.B. gasoline yield to coke yield exceeding 10/1, and a gas gravity higher than 1.2. These results, as one skilled in the art will recognize, show that the pellets of the present example are of excellent quality insofar as activity and selectivity, is concerned.

The pellets produced in this example may be tested for hardness by a ball mill procedure, as described hereinbelow. The test for hardness comprises a procedure in which a sample of catalyst pellets is first separated into three fractions by screening through 3-mesh and 5-mesh sieves until about 200 grams of the ⅗ fraction is obtained. The ⅗ fraction is then heat treated at 1050° F. by passing bone dry air over it for three hours. The heat treated material is poured into a tared 100 cc. graduate to the 80 cc. mark, with tapping to gently pack the particles. The weight of the 80 cc. of catalyst particles is determined and they are then placed in a stainless steel cylindrical container with four polished stainless steel ball bearings, each of 15/16 inch diameter. The container is closed tightly and rotated about its longitudinal axis at about 80 r.p.m., on a roller arrangement, for about one hour. After the rotation of the container has been stopped, the catalyst solids therein are screened on a 6-mesh sieve and their hardness is calculated as the percentage of total sample (i.e., the 80 cc.) weight represented by the plus-6-mesh fraction of the final material. The pellets of the present example possess a hardness of from about 65 to about 75 percent as determined by the above-described ball mill procedure. For comparative purposes the commercial catalyst Filtrol 62, which is prepared from sub-bentonite clay, when measured by the aforesaid ball mill method, is found to possess a hardness of 90 percent.

*Example II*

This example is similar to Example I except that the white mineral oil in which the clay-acid pellets are aged is first conditioned as taught herein.

White mineral oil, such as that used in Example I, is conditioned by being repeatedly contacted with mixtures of concentrated sulfuric acid and kaolin clay in which the acid is present in amount equivalent to a dosage of about 80 percent. The oil is maintained at a temperature of about 300° F. throughout its period of conditioning. During the conditioning, the clay-acid mixtures are kept in contact with the oil for periods not exceeding about 3 hours from the time they are mixed. The conditioning is handled in a continuous manner by passing clay-acid mixture through the oil at the proper rate to insure contact with said oil for a period of about 3 hours. The oil which accompanies the outgoing clay-acid mixture is recirculated back to the vessel in which said conditioning is carried out. The conditioning of the oil is continued for a period of about 50 hours.

Georgia kaolin clay is mixed with sulfuric acid of about 93.2 percent concentration, the amount of acid used being equivalent to a dosage of about 80 percent. The mixture of clay and acid is formed into pellets about 3/16 in. long and of about 3/16 in. in diameter by means of extrusion. The extruded pellets are aged in the conditioned white mineral oil, maintained at a temperature of about 300° F., for a period of about 3 hours. The aged pellets are calcined in an atmosphere of steam and hot flue gases containing reducing components until they have been substantially desulfated, during which operation they reach a maximum temperature of about 1430° F.

The desulfated pellets tested by the Cat-A procedure are substantially equivalent to those of Example I in catalytic activity. Samples of the pellets tested for hardness by the previously-described ball mill procedure were found to possess hardnesses of well above 90 percent and, in fact, as high as 97 or 98 percent. Thus the pellets of the present example have been shown to be superior to Filtrol 62 in this respect.

Comparison of the hardnesses of the pellets of the present example with those of the pellets of Example I clearly shows the unexpected improvement in hardness attributable to my novel aging liquid conditioning treatment.

I claim:

1. A method for the preparation of adsorptive contact masses from kaolin clay comprising mixing kaolin clay with sulfuric acid in an amount of from about 60% to about 130%, based on the volatile free weight of said kaolin clay, said sulfuric acid being in aqueous solution having a concentration such as to form a plastic mixture with said kaolin clay, forming shaped masses from the resulting mixture of clay and acid, immersing said shaped masses in white mineral oil which has been conditioned for a period of about 50 hours, prior to immersion of said shaped masses therein, by repeated contact with mixtures of naturally occurring clay and from about 60 percent to 100 percent sulfuric acid, based on the volatile free weight of said naturally occurring clay, under such conditions that said mixtures do not remain in contact with said oil for more than about 3 hours from the time they are prepared while maintaining the temperature of said oil within the range of from about 220° F. to about 400° F., maintaining said shaped masses in conditioned white mineral oil at a temperature of from about 220° F. to about 400° F. for a time within the range of one hour to five hours sufficient to effect substantial reaction between said kaolin clay and said sulfuric acid, and without washing out water soluble reaction products, calcining said reacted masses at a temperature of from about 900° F. to about 1600° F. for a time sufficient to decompose substantially completely aluminum sulfate in said reaction product to aluminum oxide.

2. A method for the preparation of adsorptive contact masses from kaolin clay comprising mixing kaolin clay with concentrated sulfuric acid in an amount of from about 60% to about 130%, based on the volatile free weight of said kaolin clay, extruding the resulting mixture to form pellets therefrom, immersing said pellets in white mineral oil maintained within the temperature range of from about 275° F. to about 325° F. for a period of time within the range of from about 1 hour to about 5 hours, said white mineral oil having been conditioned for a period of about 50 hours, prior to immersing said pellets therein, by repeatedly contacting it with mixtures of kaolin clay and concentrated sulfuric acid, in an amount equivalent to about 80%, based on the volatile free weight of said kaolin clay, under such conditions that said mixtures do not remain in contact with said oil for more than about 3 hours from the time they are prepared while maintaining the temperature of said oil within the range of from about 275° F. to about 325° F., and, without washing out water soluble reaction products therefrom, calcining said pellets at a temperature from about 900° F. to about 1600° F. for a time sufficient to decompose substantially completely aluminum sulfate in said pellets to aluminum oxide.

References Cited in the file of this patent

UNITED STATES PATENTS

| | | |
|---|---|---|
| 1,781,265 | Baylis | Nov. 11, 1930 |
| 2,192,000 | Wilson | Feb. 27, 1940 |
| 2,384,905 | Floyd et al. | Sept. 18, 1945 |
| 2,485,626 | Mills | Oct. 25, 1949 |
| 2,529,310 | Richardson et al. | Nov. 7, 1950 |
| 2,787,599 | Beldin | Apr. 2, 1957 |
| 2,898,304 | Powell et al. | Aug. 4, 1959 |

FOREIGN PATENTS

| | | |
|---|---|---|
| 239,169 | Great Britain | July 6, 1926 |